United States Patent
Ohno

[15] 3,675,470
[45] July 11, 1972

[54] VISCOMETER
[72] Inventor: Toshihiko Ohno, Tokyo, Japan
[73] Assignee: Rion Kabushiki Kaisha, Tokyo, Japan
[22] Filed: April 24, 1970
[21] Appl. No.: 31,548

[52] U.S. Cl. .................................................. 73/59
[51] Int. Cl. ............................................. G01n 11/16
[58] Field of Search ....................................... 73/59

[56] References Cited

UNITED STATES PATENTS 2,927,457  3/1960  Pye et al. ................................. 73/59
2,354,299  7/1944  Bays ......................................... 73/59

*Primary Examiner*—Louis R. Prince
*Assistant Examiner*—Joseph W. Roskos
*Attorney*—Wenderoth, Lind & Ponack

[57] ABSTRACT

A rotor driven by a shaft rotated at a fixed speed is subject to the drag of a liquid the viscosity of which is to be measured to apply an axial thrust to the shaft. The shaft is axially displaced against the action of a helical spring and continues to be rotated at a position where the thrust balances the resilience of the spring. A pointer responds to the displacement of the shaft through a cylindrical rack and a pinion to indicate the viscosity of the liquid.

9 Claims, 4 Drawing Figures

PATENTED JUL 11 1972
3,675,470
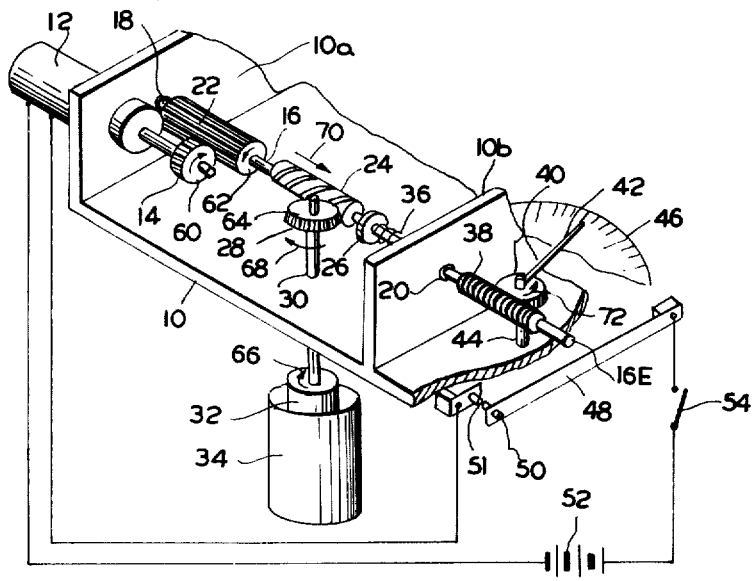
FIG.1
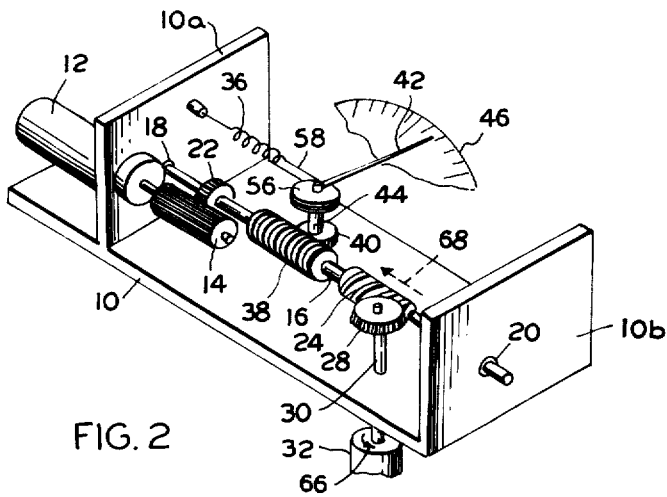
FIG.2
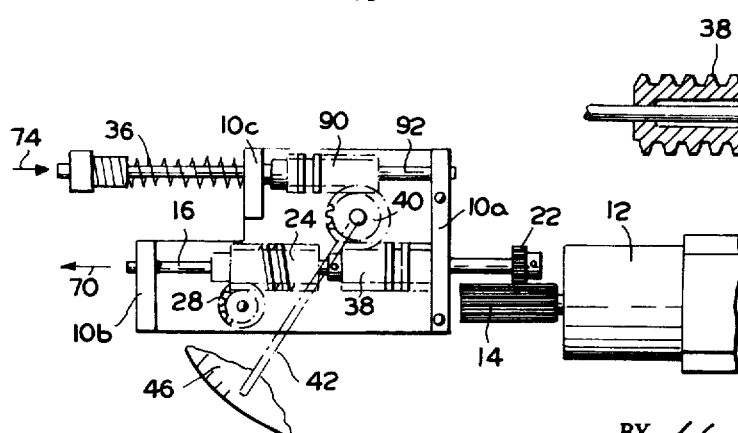
FIG.3
FIG.4
INVENTOR
TOSHIHIKO OHNO
BY Wenderoth, Lind & Ponack
ATTORNEYS

VISCOMETER

BACKGROUND OF THE INVENTION

This invention relates to improvements in a viscometer and more particularly to a viscometer for measuring the viscosity of a liquid by a mechanical element in which a rotor which is an element at the measuring end of the system is immersed and rotated in the viscous liquid.

One type of the conventional rotary viscometers including a rotor is known as the "Brookfield" type and has a pneumatic motor and a rotor connected to the motor through a coil spring, wherein the rotor responds to the drag of a liquid the viscosity of a liquid the viscosity of which is being measured to effect the corresponding torsion of the coil spring which is, in turn, detected. That type of viscometer further has a graduated dial rotatable along with the shaft of the motor leading to difficulty with which the reading is effected. In addition, after each measurement a pointer operatively associated with the dial has been held stationary by a clamp provided for that purpose, whereby a reading is effected. This leads to inconvenience in resetting after a measurement.

Another type of the conventional rotary viscometers is known as the "Epprecht" type and has included a motor, a rotor connected directly to the motor and means for detecting a reaction torque exerted on the motor itself due to the drag of a viscous liquid being measured. In such a type of viscometer it has been required to suspend the mass involving the motor and the rotor with a low torque and yet in a balanced state. Therefore the viscometers have been difficult to manufacture. Both types of viscometers as above described are also expensive.

Still another type of rotary viscometer has been previously provided by the inventor of the present invention and is disclosed in Japanese Pat. No. 303,754. These viscometers are a planetary gear type and are disadvantageous in that the gearings involved have been required to be machined with a high accuracy while balancing all the weight about the center of rotation.

SUMMARY OF THE INVENTION

Accordingly it is an object of the invention to provide a new and improved rotary viscometer which has a simple construction and is inexpensive to manufacture and wherein the above-mentioned disadvantages of the conventional viscometers are eliminated.

The invention accomplishes this object by the provision of a viscometer comprising a driving shaft longitudinally movable and rotated at a predetermined fixed speed of rotation, a spindle disposed substantially perpendicularly to the driving shaft to be rotated by the latter, a measuring end element connected to the spindle at one end and immersed in a liquid the viscosity of which is to be measured, the measuring end element as it is rotated being subject to a torque due to the drag of the liquid, and a resilient element for exerting a resilient force lengthwise of the driving shaft, characterized by means for axially applying a thrust to the driving shaft in response to the torque provided by the measuring end element to displace the driving shaft against the action of the resilient element, and means for detecting the displacement of the driving shaft.

Preferably the thrust applying means may comprise a worm member mounted on the driving shaft and a worm gear connected to the spindle at the other end to mesh with the worm member while the detecting means is arranged to indicate the position of the driving shaft where the thrust applied to the latter shaft balances the resilient force provided by the resilient element.

Advantageously the detecting means may include a cylindrical rack mounted on the driving shaft, a pinion engaging the rack mounted on the driving shaft, a pinion engaging the rack and a pointer connected to the pinion to convert the longitudinal displacement of the driving shaft to an angular displacement of the pointer.

The resilient element may conveniently apply to the pinion a force tending to rotate it in the direction opposite to the direction in which the pinion is rotated through the displacement of the driving shaft.

BRIEF DESCRIPTION OF THE DRAWING

The invention will become more readily apparent from the following detailed description taken in conjunction with the accompanying drawing in which:

FIG. 1 is a perspective view of a viscometer constructed in accordance with the principles of the invention with parts cut away;

FIG. 2 is a fragmental perspective view of a modification of the invention;

FIG. 3 is a plan view, partly in longitudinal section of a modification of the cylindrical rack shown in FIG. 1; and FIG. 4 is a plan view illustrating another form of the detection and indication device shown in FIG. 1.

DESCRIPTION OF THE PREFERRED EMBODIMENTS

Referring now to the drawing and FIG. 1 in particular, it is seen that a frame 10 of any suitable metallic material such as brass or zinc includes an upright end wall 10a extending from one end and another upright wall 10b extending from the intermediate portion and parallel to the end wall. An electric miniature motor 12 is mounted on end wall 10a and extends through the end wall 10a with the longitudinal axis thereof substantially parallel to the frame. The motor 12 is adapted to be rotated at a predetermined fixed speed of rotation. A rotary shaft extending from the motor 12 substantially parallel to and above the frame 10 has fixedly secured thereon a spur gear 14. A driving shaft 16 extends through the walls 10a and b in parallel relationship to the rotary motor shaft and is rotatably supported by a pair of bearings 18 and 20 fitted into the walls respectively. The driving shaft 16 has a longitudinally elongated gear 22, a worm 24 and a collar 26 mounted thereon in spaced relationship and in the named order starting from the end wall 10a. The gear 22 meshes with the gear 14 and the worm 24 meshes with a horizontally disposed worm gear 28 rigidly secured on one end of a spindle 30 loosely extending through the frame 10 and substantially perpendicular to the driving shaft 16. The spindle 30 has rigidly secured to the other end a rotor 32 forming a measuring end element to be immersed in a liquid the viscosity of which is to be measured contained in a measuring vessel 34.

A resilient element 36 shown in FIG. 1 as being a helical spring is disposed around the driving shaft 16 between the collar 26 and the intermediate wall 10b. The driving shaft 16 is provided on that portion thereof projecting beyond the wall 10b with a cylindrical rack 38 engaging a pinion 40. A pointer 42 is mounted on a shaft 44 for the pinion 40 and is adapted to swing above a graduated dial 46. The driving shaft 16 has a righthand extremity 16E as viewed in FIG. 1 opposed to a leaf spring 48 and normally there will be a predetermined spacing therebetween.

The leaf spring 48 has disposed at one end an electric contact 50 normally engaging an electric stationary contact 51. The leaf spring 48 is electrically connected at the other end to one side of an electric source 52 through a normally open switch 54. The source 52 is electrically connected on the other side to the contact 51 through the motor 12. Thus the contacts 50 and 51 provides a normally closed switch.

Since liquids may be acidic or alkaline, the rotor 32, the shaft 30, the driving shaft 16, the collar 26 and the spring 36 are preferably of any suitable anti-corrosive metallic material such as a stainless steel and the bearings 18 and 20, the gears 14, 22 and 28, the worm 24 and the cylindrical rack 38 are preferably of any suitable plastic such as polyacetal resin. The pointer 42 may be of brass or stainless steel and the dial 46 may be of aluminum.

With the components in their positions illustrated in FIG. 1, the switch 54 can be closed to rotate the motor 12 and therefore the gear 14 at a predetermined fixed speed of rotation in the direction of the arrow 60 shown in FIG. 1. This rotational movement of the gear 14 is transmitted through the gear 22 to the driving shaft 16 thereby to rotate it at a predetermined fixed speed of rotation in the direction of the arrow 62 shown in the same FIG. Therefore the worm 24 on the driving shaft 16 rotates the gear 28 and hence the rotor 32 in the direction of the arrow 64 shown on the spindle 30 in FIG. 1. Then the rotating rotor 32 is subjected to a viscous resistance or a drag of the particular liquid the viscosity of which is being measured. That is, the rotor is subject to a torque proportional to the viscosity of the liquid in the direction of arrow 66 shown in FIG. 1. Thus the gear 28 is subject to that torque in the direction of arrow 68 shown in FIG. 1 to apply an axial thrust to the worm 24 in the direction of arrow 70 shown in the same FIG. That thrust serves to move the driving shaft 16 toward the wall 10b against the action of the helical spring 36. Then the spring 36 is compressed in response to the movement of the driving shaft 16 and the driving shaft 16 continues to be rotated at the fixed speed at its position where the resilience provided by the spring 36 has balanced the thrust.

The axial displacement of the driving shaft 16 causes the cylindrical rack 38 to be longitudinally moved to rotate the pinion 40 in the direction of the arrow 72 shown in FIG. 1 through an angle corresponding to the displacement of the rack 38 and therefore of the shaft 12. Accordingly the pointer 42 is rotated through the same angle above the dial 46. With the dial 46 graduated in terms of viscosity, the viscosity to be measured can be directly read by that graduation on the dial 46 coinciding with the moved pointer 42.

If the rotor 32 is subject to a torque sufficient to swing the pointer 42 outside of the scale on the dial 46, then the extremity 16E of the driving shaft 16 abuts against the leaf spring 48 to separate the contact 50 from the contact 51 whereupon the circuit for energizing the motor 12 is opened to stop the motor. This ensures that the motor 12 is prevented from being overloaded.

A modification of the invention is illustrated in FIG. 2 wherein like reference numerals designate the components identical or corresponding to those shown in FIG. 1. The gear 14 operatively coupled to the motor 12 is longitudinally elongated and the mating gear 22 is relatively thin although this is not essential. Also, the cylindrical rack 38 is mounted on that portion disposed between the frame walls 10a and b of the driving shaft 16. Therefore the pinion 40 and the associated components are in different positions from those shown in FIG. 1.

The arrangement of FIG. 2 is different from that shown in FIG. 1 mainly in that the shaft 44 of the pinion 40 has mounted at one end a pulley 56 made, for example of aluminum while a length of cord 58 of stainless steel or linen yarn has one end portion wrapped around the pulley 56 with the one end fixed to the latter and the other end connected to one end of the helical spring 36 having the other end suitably anchored to the frame wall 10a. Therefore the helical spring 36 is not disposed around the driving shaft 16. It is noted that all the rotating members have their directions of rotation opposite to those shown in FIG. 1.

In the embodiment illustrated, the spring 36 serves to maintain the length of cord 58 in a tensioned state tending to rotate the pulley 56 in the counterclockwise direction as viewed in FIG. 2.

As in the arrangement of FIG. 1, the rotating rotor 32 is subject to a torque in the direction of arrow 66 shown in FIG. 2 to displace the driving shaft 16 in the direction of the arrow 68. This displacement of the shaft 16 causes the pinion 40 and therefore the pulley 56 to be rotated in a direction opposite to the direction in which the spring 36 tends to rotate the pulley 56. That is, the pointer 46 will be moved to further pull the spring 36. Therefore it will be appreciated in the arrangement of FIG. 2 that the displacement of the driving shaft 16 balances a torque provided by the spring 36 to tend to rotate the pulley 56. In other respects the arrangement is identical to that shown in FIG. 1.

The arrangement of FIG. 2 is advantageous in that the rack 38 always engages the pinion 40 only on one side of their teeth, resulting in the elimination of small vibration of the pointer 42.

FIG. 3 shows an improved form of the cylindrical rack 38. Assuming that the rack 38 is always subject to a force tending to move it in the righthand direction as viewed in FIG. 3, the cylindrical rack 38 is rotatably mounted on driving shaft 16 on the left side as viewed in the same Figure of a retainer ring 80 rigidly secured on the driving shaft 16 with a thrust ball bearing 82 threaded onto the shaft 16 therebetween. As shown in FIG. 3, the rack 38 has both end portions in rotational contact with the shaft 16 and an intermediate portion 84 having an inside diameter greater than the diameter of the shaft 16.

The arrangement of FIG. 3 is effective for greatly decreasing the friction occurring between the engaging portions of the rack 38 and the mating pinion such as the pinion 40 shown in FIG. 1. This results in a decrease in the load upon the motor 12 and therefore in power consumption required to energize the motor 12. It is particularly suitable in the case the source 52 is a battery.

In order to compensate for any backlash that may occur between the rack and pinion 38 and 40 respectively, the arrangement shown in FIG. 4 can be used. In FIG. 4 like reference numerals designate the components identical or corresponding to those shown in FIG. 2. In FIG. 4, the pinion 40 also engages another cylindrical rack 90 rigidly mounted on a second shaft 92 which is, in turn, supported by a pair of opposite frame walls 10a and c for axial movement. The shaft 92 is disposed in parallel relationship to the driving shaft 16 and has a portion projecting beyond the end wall 10c. A helical spring 36 is disposed around the extension between the extremity thereof and the wall 10c to serve normally to bias the rack 90 toward the wall 10c. In other respects the arrangement is similar to that shown in FIG. 2.

In operation, the rotating shaft 16 is displaced in the direction of the arrow 70 shown in FIG. 4 to rotate the pinion 40 along with the pointer 42 in the clockwise direction as viewed in FIG. 4. Thus the pinion 40 displaces the rack 90 and therefore the shaft 92 in the direction of the arrow 74 shown in FIG. 4 against the action of the spring 36 until the shaft 92 reaches such a position that it stops its displacement by means of the resilience of the spring 36 and continues to be rotated at the fixed speed.

In the arrangement of FIG. 4, the spring 36 always exterts a unidirectional force on the racks 38 and 90 and the pinion 40 to remove any backlash therebetween that may occur between the forward and reverse movements of the rack 38 in response to the viscosity of the liquid. This ensures that the fluctuation of the pointer is minimized.

While the invention has been illustrated and described in conjunction with a few preferred embodiments thereof, it is to be understood that various changes and modifications may be made without departing from the spirit and scope of the invention. For example, the resilient element 36 may be formed of a combination of a plurality of helical springs to indicate the viscosity in a logarithmic scale. Also, the rack 38, the pinion 40 etc. may be replaced by any suitable mechanical-to-electrical transducer such as a differential transformer to effect a remote indication.

What is claimed is:

1. A viscometer comprising a source of electric power, an electric motor coupled to and energized by said source, a longitudinally displaceable driving shaft connected to and rotated at a predetermined fixed speed by said electric motor, a spindle disposed substantially perpendicularly to said driving shaft, coupling means coupling said spindle and said driving shaft so that said spindle is rotated by said driving shaft, a measuring end element connected to said spindle and immersed in a liquid the viscosity of which is to be measured, said measuring end element, when rotated, being subject to a torque due to the drag of the liquid, a resilient element operatively coupled to said driving shaft for exerting a resilient force on said driving shaft in the axial direction thereof, said coupling means being responsive to said torque to which said measuring end element is subjected to axially apply a thrust to said driving shaft to longitudinally displace said shaft against the action of said resilient element, and a detector including a cylindrical rack mounted on said driving shaft, a pinion engaging said rack, and a pointer operatively coupled to said pinion to convert the longitudinal displacement of said driving shaft to an angular displacement thereof which is a measure of the viscosity of said liquid.

2. A viscometer as claimed in claim 1 further comprising a switch adjacent said driving shaft and responsive to said longitudinal displacement of said driving shaft, said switch being connected between said motor and said source to connect and disconnect said motor to and from said source.

3. A viscometer as claimed in claim 1 wherein said cylindrical rack is rotatably mounted on said driving shaft, and means engaging said rack for preventing said rack from moving in one of the axial directions of the driving shaft.

4. A viscometer as claimed in claim 1 wherein said resilient element is at least one helical spring.

5. A viscometer comprising a source of electric power, an electric motor coupled to and energized by said source, a longitudinally displaceable driving shaft connected to and rotated at a predetermined fixed speed of rotation by said electric motor, a spindle disposed substantially perpendicularly to said driving shaft, coupling means coupling said spindle and said shaft so that said spindle is rotated by said shaft, a measuring end element connected to said spindle and immersed in a liquid the viscosity of which is to be measured, said measuring end element, when rotated being subject to a torque due to the drag of the liquid, said means being responsive to said torque to which said measuring end element is subjected to axially apply a thrust to said driving shaft to longitudinally displace said shaft, and a detector including a cylindrical rack mounted on said driving shaft, a pinion engaging said rack, a pointer operatively coupled to said pinion to convert the longitudinal displacement of said driving shaft to an angular displacement thereof which is a measure of the viscosity of said liquid, and a resilient element operatively coupled to said pinion to tend to rotate the latter in a direction opposite to the direction in which the pinion is rotated through the longitudinal displacement of said driving shaft.

6. A viscometer as claimed in claim 5 further comprising a switch adjacent said driving shaft and responsive to said longitudinal displacement of said driving shaft, said switch being connected between said motor and said source to connect and disconnect said motor to and from said source.

7. A viscometer as claimed in claim 5 wherein said cylindrical rack is rotatably mounted on said driving shaft, and means engaging said rack for preventing said rack from moving in one of the axial directions of the driving shaft.

8. A viscometer as claimed in claim 5 wherein said resilient element is at least one helical spring.

9. A viscometer comprising a source of electric power, an electric motor coupled to and energized by said source, a longitudinally displaceable driving shaft connected to and rotated at a predetermined fixed speed of rotation by said electric motor, a spindle disposed substantially perpendicularly to said driving shaft, coupling means coupling said spindle and said shaft so that said spindle is rotated by said shaft, a measuring end element connected to said spindle and immersed in a liquid the viscosity of which is to be measured, said measuring end element, when rotated being subject to a torque due to the drag of the liquid, said coupling means being responsive to said torque to which said measuring end element is subjected to axially apply a thrust to said driving shaft to longitudinally displace said shaft, a detector including a cylindrical rack mounted on said driving shaft, a pinion engaging said rack and a pointer operatively coupled to said pinion to convert the longitudinal displacement of said driving element to an angular displacement thereof which is a measure of the viscosity of said liquid, and backlash compensation means including a second shaft disposed in parallel relationship to said driving shaft, a further cylindrical rack fixedly mounted on said second shaft and engaging said pinion on said second shaft to exert a resilient force on the latter in the axial direction thereof.

* * * * *